(12) United States Patent
Nishikawa

(10) Patent No.: US 9,248,534 B2
(45) Date of Patent: Feb. 2, 2016

(54) CUTTING APPARATUS AND METHOD

(75) Inventor: Hirozi Nishikawa, Tokyo (JP)

(73) Assignee: FUJI JUKOGYO KABUSHIKI KAISHA, Tokyo (JP)

(*) Notice: Subject to any disclaimer, the term of this patent is extended or adjusted under 35 U.S.C. 154(b) by 786 days.

(21) Appl. No.: 13/558,950

(22) Filed: Jul. 26, 2012

(65) Prior Publication Data

US 2013/0032015 A1 Feb. 7, 2013

(30) Foreign Application Priority Data

Aug. 3, 2011 (JP) ................................ 2011-170119

(51) Int. Cl.
| | |
|---|---|
| B23P 25/00 | (2006.01) |
| B23K 26/08 | (2014.01) |
| B23K 26/00 | (2014.01) |
| B23C 1/00 | (2006.01) |

(52) U.S. Cl.
CPC .......... *B23P 25/006* (2013.01); *B23K 26/0093* (2013.01); *B23K 26/08* (2013.01); *B23C 1/00* (2013.01); *Y10T 29/5107* (2015.01); *Y10T 29/5176* (2015.01); *Y10T 83/0414* (2015.04); *Y10T 83/283* (2015.04); *Y10T 408/03* (2015.01); *Y10T 409/303752* (2015.01)

(58) Field of Classification Search
CPC ...... B23P 25/00; B23P 25/003; B23P 25/006; B23K 26/00; B23K 26/08; Y10T 29/5105; Y10T 29/5107; Y10T 29/5176; Y10T 408/03; Y10T 408/21; Y10T 409/303752; Y10T 409/303808

USPC ................ 29/26 A, 26 R, 56.5; 408/1 R, 16; 409/131, 132

See application file for complete search history.

(56) References Cited

U.S. PATENT DOCUMENTS

| | | | | |
|---|---|---|---|---|
| 4,733,049 | A * | 3/1988 | Lemelson ................ | 219/121.69 |
| 5,906,459 | A * | 5/1999 | Thomas et al. ............... | 409/132 |
| 6,465,756 | B2 * | 10/2002 | Tanaka et al. .............. | 219/121.6 |
| 6,666,630 | B2 * | 12/2003 | Zimmermann et al. ...... | 409/132 |
| 7,002,100 | B2 * | 2/2006 | Wu et al. ................... | 219/121.69 |
| 7,257,879 | B1 * | 8/2007 | Jancso et al. .................... | 29/566 |
| 2007/0062920 | A1 * | 3/2007 | Shin .......................... | 219/121.72 |

FOREIGN PATENT DOCUMENTS

JP 2003-19615 1/2003

* cited by examiner

*Primary Examiner* — Erica E Cadugan
*Assistant Examiner* — Michael Vitale
(74) *Attorney, Agent, or Firm* — Konomi Takeshita

(57) ABSTRACT

A cutting device (1) comprises: a guiderail (18) that is formed into a ring shape along the circumference around the central axis (10*c*) of a cutting drive unit (10); a laser irradiation unit (22) that is movable along the guiderail, and irradiates a laser at a predetermined inclination angle onto an object (30) to be cut; a preset cutting position derivation unit (26*a*) for deriving a preset cutting position that corresponds to a preset cutting portion, which is the portion to be cut by a cutting tool (10*b*) after a predetermined amount of time; a stopping position derivation unit (26*b*) for deriving the stopping position of the laser irradiation unit on the guiderail with the preset cutting position that was derived as a target; and a laser irradiation drive unit (24) for moving the laser irradiation unit to the derived stopping position.

3 Claims, 4 Drawing Sheets

CUTTING APPARATUS AND METHOD

CROSS REFERENCE TO RELATED APPLICATIONS

This application claims priority under 35 U.S.C. 119 based upon Japanese Patent Application Serial No. 2011-170119, filed on Aug. 3, 2011. The entire disclosures of the aforesaid applications are incorporated herein by reference.

FIELD OF THE INVENTION

The present invention relates to a cutting apparatus and a cutting method for cutting an object into a free shape.

BACKGROUND OF THE INVENTION

So-called milling is performed on an object that is made of a metal material to form a flat surface. Milling is a processing method for an object to be cut (work) into a flat shape by rotating a cutting tool such as an end mill, a face mill, a plunger, a drill or the like that is fixed to a main spindle (rotating shaft) at high speed.

A material such as a titanium (Ti) is a material having excellent corrosion resistance, heat resistance and strength, however, for that reason, is classified as a material that is difficult to cut, and when milling is attempted, cutting requires time and invites early wear of the cutting tool. Therefore, processing to improve the cutting efficiency is performed by irradiating the site on an object to be cut where cutting will be performed (preset cutting site) with a laser beforehand, and heating that preset cutting site. Japanese Laid-open Patent Publication No. 2003-19615, for example, discloses technology wherein at the same time that milling is performed, the cutting cross-section surface is heated using a laser a few millimeters ahead of the current cutting location.

However, in the technology disclosed in Japanese Patent Application No. 2003-19615, because the positional relationship between the cutting tool and the laser device is fixed, the areas that are shaded by the cutting tool are created and these areas cannot be physically irradiated by the laser, and thus causing a problem of the cutting efficiency and inconvenience.

SUMMARY OF THE INVENTION

In light of the above problem, the purpose of the present invention is to provide a cutting apparatus and cutting method that make it possible to improve cutting efficiency and convenience by overcoming a problem with restrictions to the areas that can be irradiated by a laser.

According to a first embodiment of the present invention for achieving the purpose described above, there is provided:
a cutting device having a cutting tool for cutting an object; comprising:
a mounting table to which the object to be cut is secured:
a cutting tool drive unit for axially supporting the cutting tool so that the cutting tool faces the object to be cut that is secured to the mounting table, and rotatably driving the cutting tool around the central axis thereof;
a relative movement mechanism for causing a relative movement of the cutting tool and object to be cut;
a guiderail fixed to the non-rotating section of the cutting tool drive unit, wherein the guiderail extends along the circumferences of the central axis of the cutting tool;
a laser irradiation mechanism comprising a laser irradiation unit for irradiating a laser toward the object to be cut that is secured to the mounting table, and a support mechanism for movably supporting the laser irradiation unit along the guiderail, wherein the support mechanism supports the laser irradiation unit so that the optical axis of the laser forms a predetermined inclination angle with respect to the central axis of the cutting tool;
a preset cutting position derivation unit for deriving a preset cutting position on the object for which the cutting is to be performed by the cutting tool after a predetermined amount of time has elapsed;
a target position derivation unit for deriving a target position to which the laser irradiation unit is to be moved by the support mechanism, wherein the target position is a position which enables the laser irradiation unit to irradiate the laser toward the preset cutting position on the object to be cut; and
a laser position control unit connected to the support mechanism and the target position derivation unit, and for controlling the support mechanism such that the laser irradiation unit moves to the target position derived by the target position derivation unit.

According to a second embodiment of the present invention for achieving the purpose above, it is preferable that the preset cutting position derivation unit derives the preset cutting position by adding a distance that is equal to the amount that the cutting tool moves over the object to be cut during the predetermined time to the current cutting position of the cutting tool on the object to be cut.

According to a third embodiment of the present invention for achieving the purpose above, there is provided
a cutting method for cutting an object by a cutting device, wherein the cutting device comprises:
a mounting table to which the object to be cut is secured:
a cutting tool drive unit for axially supporting the cutting tool so that the cutting tool faces the object to be cut that is secured to the mounting table, and rotatably driving the cutting tool around the central axis thereof;
a relative movement mechanism for causing a relative movement of the cutting tool and object to be cut;
a guiderail that fixed to the non-rotating section of the cutting tool drive unit wherein the guiderail extends along the circumference of the central axis of the cutting tool; and
a laser irradiation mechanism comprising a laser irradiation unit for irradiating a laser toward the object to be cut that is secured to the mounting table, and a support mechanism for movably supporting the laser irradiation unit along the guiderail, wherein the support mechanism supports the laser irradiation unit so that the optical axis of the laser forms a predetermined inclination angle with respect to the central axis of the cutting tool;
the cutting method comprising the steps of:
deriving a preset cutting position on the object for which a cutting is to be performed by the cutting tool in a processing direction that is orthogonal to the central axis of the cutting tool after a predetermined amount of time has elapsed;
deriving a target position to which the laser irradiation unit is to be moved by the support mechanism, wherein the target position is a position which enables the laser irradiation unit to irradiate the laser toward the preset cutting position on the object to be cut; and
controlling a laser position by controlling the support mechanism such that the laser irradiation unit moves to the target position derived by a target position derivation unit.

With the present invention, by rotating and moving the laser irradiation unit around the central axis, it is possible to avoid restrictions to the area that can be irradiated by the laser, and by preheating the preset cutting site it is possible to improve cutting efficiency and convenience.

Other features and advantages of the present invention will become apparent from the following detailed description, taken in conjunction with the accompanying drawings, which illustrate, by way of example, the principles of the invention.

DETAILED DESCRIPTION OF THE INVENTION

Figure 1:
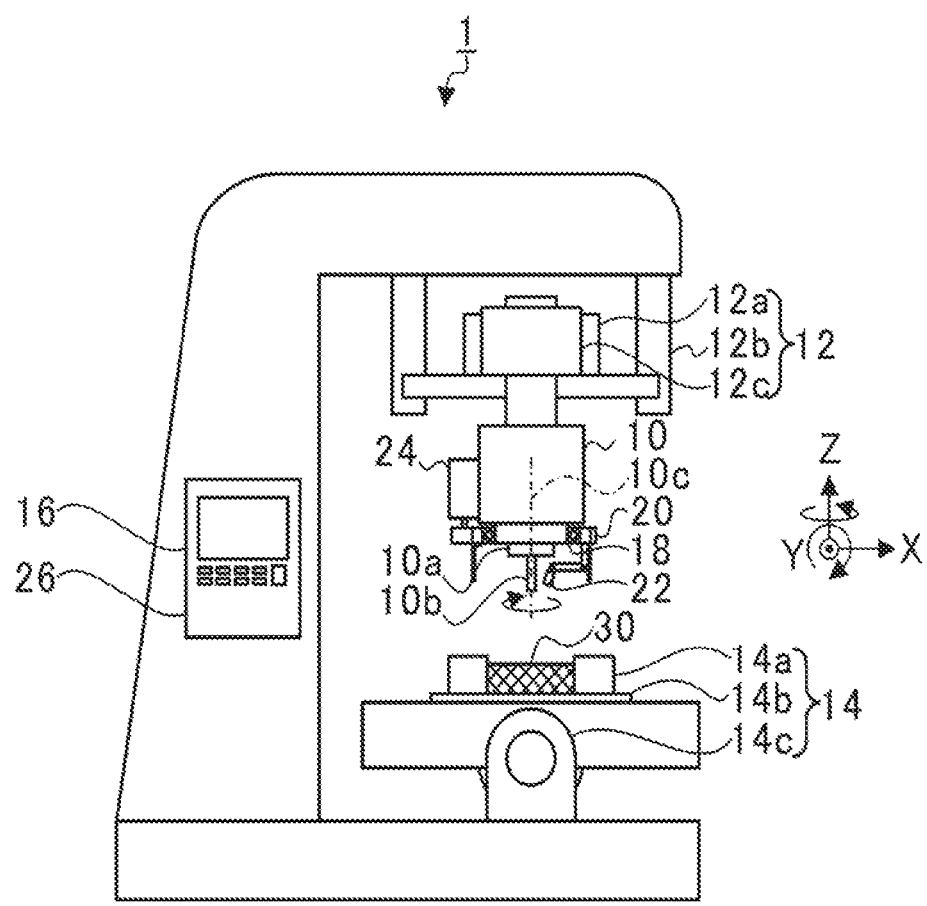
FIG. 1 is a drawing for explaining the basic construction of the cutting apparatus.

In the following, a preferred embodiment of the present invention will be explained. Dimensions, materials and other detailed numerical values are only examples for making it easier to understand the invention, and unless specially indicated, do not limit the present invention. In this specification and drawings, the same reference numbers will be given to elements having essentially the same function, and any redundant explanation will be omitted, as well as elements that are not directly related to the present invention will be omitted in the drawings.

(Cutting Apparatus 1)

FIG. 1 is a drawing for explaining the basic construction of a cutting apparatus of this embodiment. The cutting apparatus 1 comprises a cutting drive unit 10 that functions as a cutting mechanism, a drive movement unit 12 that functions as a relative movement mechanism, a mounting table 14, a CAM (Computer Aided Manufacturing) unit 16, guiderail 18 that functions as a pre-heating mechanism, a rotating body 20, a laser irradiation unit 22, a laser irradiation drive unit 24, and an irradiation control unit 26; and this cutting apparatus 1, for example, cuts a flat surface out of an object 30 to be cut that is made of a metallic material. Moreover, the cutting apparatus 1 can comprise a 5-axis machining center or a gantry type profiler; with an example of a 5-axis machining center being explained in this embodiment as a relative movement mechanism.

(Cutting Mechanism)

The cutting drive unit 10, comprises, for example, an electric motor and a reduction gear for damping the speed of rotation (not illustrated in the figure), and rotatably supports a cutting tool 10b by way of a spindle head 10a. It is possible to use tools having various uses, such as an end mill, a face mill, a plunger, a drill and the like, as the cutting tool 10b.

(Relative Movement Mechanism)

The drive movement unit 12 comprises: an X slider 12a that makes a relative linear movement of the cutting drive unit 10 in the X direction with respect to the object 30 to be cut possible, a Y slider 12b that makes a relative linear movement in the Y direction possible, and a Z slider 12c that makes a relative linear movement in the Z direction possible. This makes it possible to cut the object 30 to be cut at an arbitrary plane and height, while maintaining the orientation of the cutting drive unit 10.

The mounting table 14 is a table on which the object 30 to be cut is placed, and is constructed so that it is possible to secure the object 30 to be cut by a locking fixture 14a. Moreover, the mounting table 14 comprises: a rotating table 14b that is capable of a relative rotating movement around the Z axis, and an inclined table 14c that is capable of a relative rotating movement around the Y axis with respect to the cutting tool 10b of the cutting drive unit 10; and is capable of arbitrarily tilting the orientation of the object 30 to be cut.

By causing a relative movement of the drive movement unit 12 and mounting table in this way, the relative movement mechanism causes a relative movement of the cutting drive unit 10 that is fixed to the drive movement unit 12 and the object 30 to be cut that is secured to the mounting table 14, and adjusts the cutting position, cutting height and the orientation of the object 30 to be cut.

The CAM unit 16 is a computer for executing a NC (Numerical Control) program. The NC program is correlated with the cutting state (movement direction, movement amount, movement speed, and the like) and the order of execution that are set for the cutting process of the object 30 to be cut based on the shape data for the object 30 to be cut that was created using CAD (Computer Aided Design).

Commands such as "X1000" that causes a movement in the X-axis direction a distance of 1000 units, "Y1000" that causes a movement in the Y-axis direction a distance of 1000 unit, "X1000,Y1000" that causes a diagonal movement by performing movement in the X-axis and Y-axis direction at the same time, and "F800" that changes the movement speed are used in the NC program. This makes it possible to perform cutting of the object 30 to be cut easily and accurately without human intervention. Here, the unit distance is a distance according to various standards such as actual distance like meters and pixels.

The CAM unit 16, based on this kind of NC program, sets a target movement amount and target rotation amount for the drive movement unit 12 and mounting table 14, and by performing closed loop control using an encoder or the like, causes the drive movement unit 12 and mounting table 14 to accurately follow the set target movement amount and target rotation amount. Here, a desired cutting state is achieved by the drive movement unit 12 and mounting unit 14 working together.

(Pre-Heating Mechanism)

As described above, when simple cutting is performed on a difficult to cut material such as titanium (Ti) that is a target of this embodiment, not only time is wasted, but also early wear of the cutting tool 10b occurs. In this embodiment, a laser is irradiated beforehand on a site (preset cutting site) where the object 30 is to be cut, and the cutting efficiency is improved by heating that site, and particularly, the purpose of irradiating the object 30 with that laser is to perform adequate tracking control of the preset cutting site while at the same time overcoming a problem with restrictions to the areas that can be irradiated by a laser.

Figure 2:
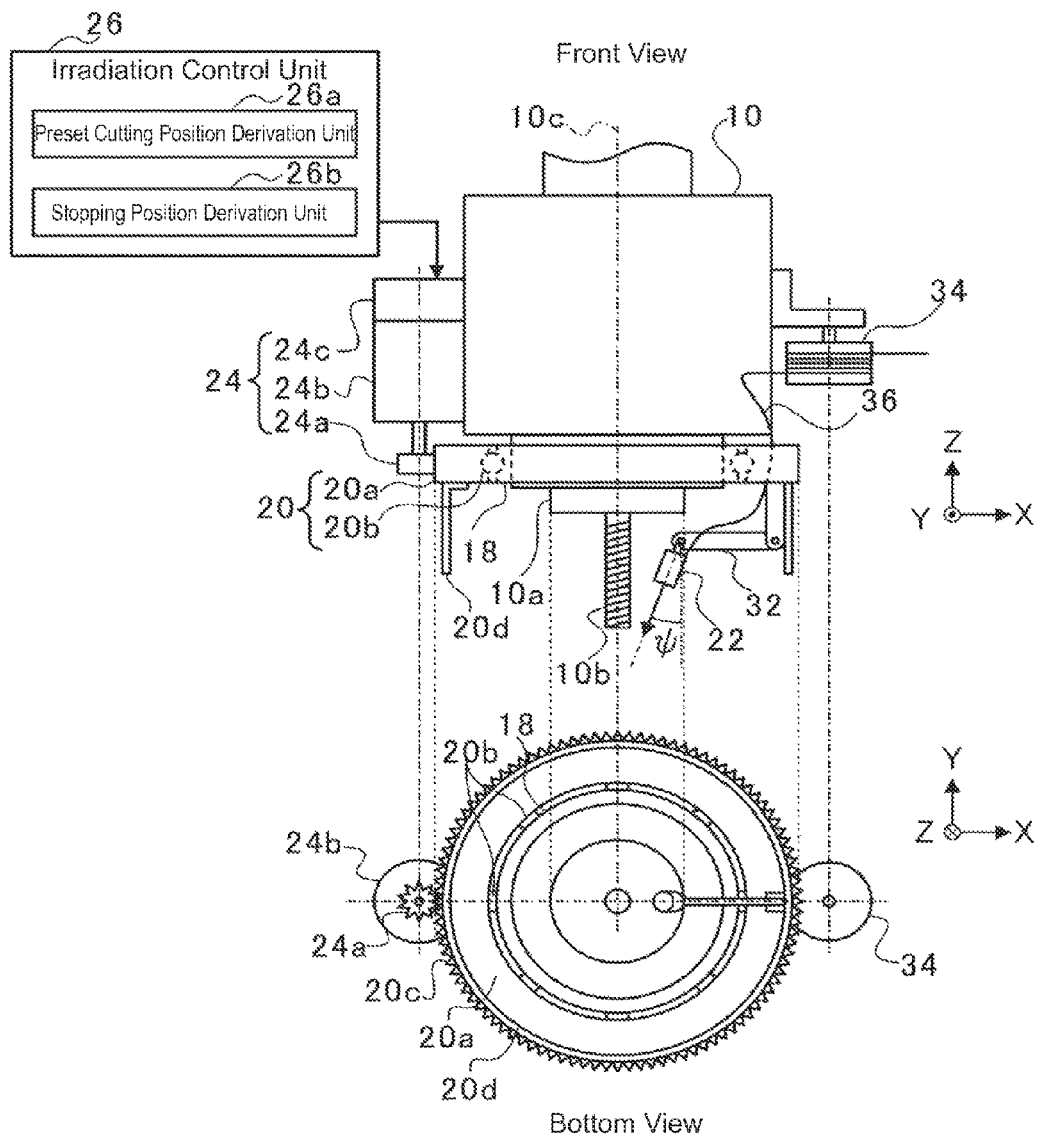
FIG. 2 is a front view and a bottom view for explaining the basic construction of a pre-heating mechanism.

FIG. 2 is a front view and bottom view for explaining the basic construction of the pre-heating mechanism. A guiderail 18 is provided on the fixed side of the cutting drive unit 10 (here, this is the spindle head 10a), and is a ring-shaped metal member that is formed along the circumference and centered around a main axis 10c.

The rotating body 20 has the same center (main axis 10c) and comprises a ring-shaped metal member 20a having a larger diameter than the guiderail 18, and rollers 20b that are held between the guiderail 10 and metal member 20a and rotatably support the metal member 20a. A ring gear 20c is formed around the outer circumference of the rotating body 20, and is used for rotating and moving the laser irradiation unit 22 that will be described later. However, a rotating mechanism such as the rotating body 20 is not limited to comprising configuration of the metal member 20a and rollers 20b, and various methods for moving the laser irradiation unit 22 in the circumferential direction can be used. Moreover, on the end section on the outer circumferential side of the rotating body 20, there is a safety cover 20d for maintaining safety during the cutting process that is ring shaped and hangs down in the vertical direction.

The laser irradiation unit 22 is fixed particularly to the metal member 20 of the rotating body 20 by way of an arm 32, and by moving in the circumferential direction along the guiderail 18, irradiates a laser on the object 30 to be cut at a predetermined inclination angle φ. The electric power required by the laser irradiation unit 22 is received by way of a power line 36 that is wound around a chord reel 34 such that it can extend freely. The laser irradiation unit 22 comprises a high-output laser oscillator, and is able to heat an irradiation area that is specified by a 20 mm diameter circle on the surface of the metal object 30 that is to be cut to a temperature of 600° C. or greater in less than a second.

The direction on the horizontal plane of the laser of the laser irradiation unit 22 is fixed in the direction of the main axis 10c (direction of the circle center), and the direction in the vertical direction is set along the inclination angle φ on the tip end side of the cutting tool 10b. Therefore, the irradiation position of the laser is always an equal distance from the main axis 10c when the surface of the object 30 to be cut is assumed to be horizontal, and the irradiation track when the laser irradiation unit 22 is rotated in the circumferential direction along the guiderail 18 is a continuous circle centered around the main axis 10c. The irradiation position of the laser will be described in detail later.

The laser irradiation drive unit 24 moves the laser irradiation unit 22 to the stopping position on the guiderail 18 that was derived by the irradiation control unit 26 that will be described later. More specifically, the laser irradiation drive unit 24 comprises a pinion 24a, an electric motor 24b that transmits power to the ring gear 20c by way of the pinion 24a, and an encoder 24c that detects the amount of rotation of the rotating shaft of the electric motor 24b. The laser irradiation drive unit 24 accurately moves the laser irradiation unit 22 to the stopping position, which is the target value, according to closed-loop control by the encoder 24c.

In the example above, construction is such that the electric motor 24b and encoder 24c do not collide with the laser irradiation unit 22, so the range of rotating movement of the laser irradiation unit 22 is not physically limited. However, in this embodiment, due to a restriction caused by the electric wiring 36, the range of rotating movement of the laser irradiation unit 22 is limited to $-\pi \leq$ angle of rotation $\theta \leq \pi$.

The irradiation control unit 26 comprises a semiconductor integrated circuit that includes a central processing unit (CPU), a ROM that stores programs and the like, and a RAM as a work area, and working together with the CAM unit 16, manages and controls the entire cutting device 1. The irradiation control unit 26 also functions as a preset cutting position derivation unit 26a, and a stopping position derivation unit 26b.

The preset cutting position derivation unit 26a, based on a NC program, adds the distance moved during a preset predetermined time (hereafter, simply referred to as the movement distance) to the current cutting position (position of the cutting tool 10b) that is known by the CAM unit 16, and derives a preset cutting position that corresponds to the preset cutting site, which is the cutting site of the cutting tool 10b after a predetermined time. However, because the NC program mainly uses the position (coordinates) and distance on the X, Y and X axes, the explanation here uses coordinates and distance that correspond to the preset cutting position after a predetermined time, rather than time. However, this is not limited to a predetermined time, and any unit that corresponds to the predetermined time can be used.

Figure 3A:
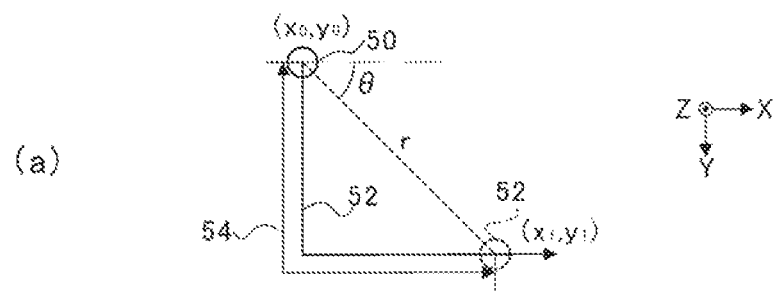
FIGS. 3A to 3C is a drawing for explaining the processing performed by a preset cutting position derivation unit and a stopping position derivation unit.
Figure 3B:
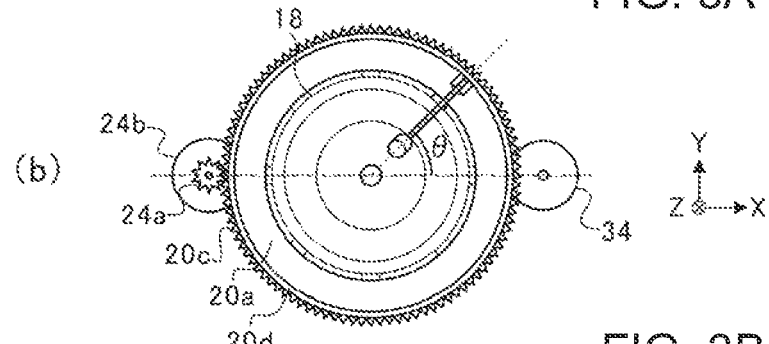
Figure 3C:
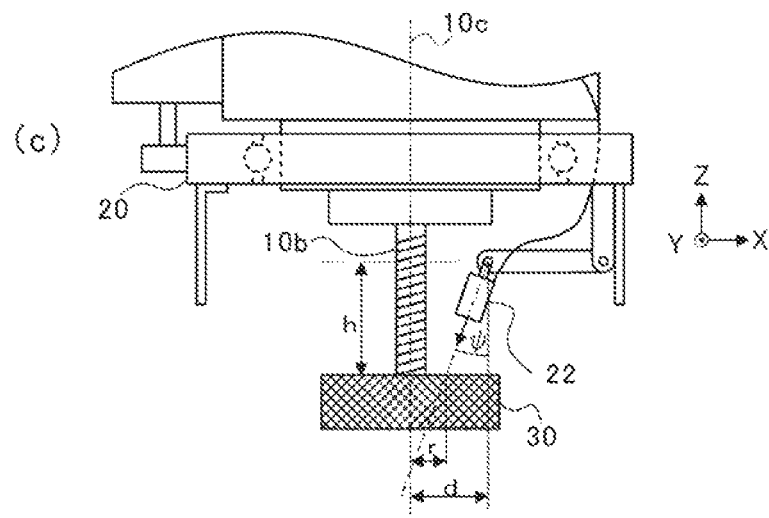

FIG. 3A to FIG. 3C are drawings for explaining the processing by the preset cutting position derivation unit 26a and the stopping position derivation unit 26b. The preset cutting position derivation unit 26a, based on a set predetermined time and the relative movement speed of the cutting tool 10b and the object 30 to be cut, finds the product of the predetermined time and relative movement speed beforehand as the movement distance. Then, the preset cutting position derivation unit 26a, by way of the NC program, finds the movement track (movement distance and movement direction) 52 from the current cutting position 50 (coordinates (x0, y0)) in the top view of the cutting device 1 illustrated in FIG. 3A. The preset cutting position derivation unit 26a then identifies the preset cutting position, where the distance from the cutting position 50 on the movement track 52 is the movement distance 54 that was found beforehand, and derives the coordinates (x1, y1) that indicate that preset cutting position. Here, in order to make the explanation easier to understand, the coordinate in the Z direction is taken to be the same value and is not considered.

The preset cutting position derivation unit 26a transmits the current cutting position and the preset cutting position, or the relative distance of the preset cutting position with respect to the current cutting position to the stopping position derivation unit 26b.

The stopping position derivation unit 26b derives the stopping position of the laser irradiation unit 22 on the guiderail 18 in order to irradiate the laser with the preset cutting position derived by the preset cutting position derivation unit 26a as a target.

More specifically, the stopping position derivation unit 26b, based on the coordinates (x1, y1) that indicate the derived preset cutting position, and the coordinates (x0, y0) that indicate the current cutting position, uses the equations 1 and 2 below to find the distance r to the coordinates (x1, y1) and the angle θ with the coordinates (x0, y0) illustrated in FIG. 3A as a reference.

$$r = \sqrt{((x1-x0)2+(y1-y0)2))} \quad \text{(Equation 1)}$$

$$\theta = \sin^{-1}((y1-y0)/r) \quad \text{(Equation 2)}$$

The angle θ, as illustrated in the bottom view of the cutting device in FIG. 3B, can be used as is as the angle of rotation θ of the laser irradiation unit 22.

Moreover, as illustrated by the front view of the cutting device 1 in FIG. 3C, the stopping position derivation unit 26b finds the inclination angle φ using Equation 3 below based on the distance r, the laser irradiation height h from the preset irradiation site, and the laser irradiation horizontal distance d from the main axis 10c.

$$\phi = \tan^{-1}((d-r)/h) \quad \text{(Equation 3)}$$

In this way, the stopping position derivation unit 26b can derive the angle of rotation θ and inclination angle φ of the laser irradiation unit 22.

However, in this embodiment, only the angle of rotation θ of the laser irradiation unit 22 is controlled, and control of the inclination angle φ is omitted. This is because, the irradiation range of the laser by laser irradiation unit 22 is a large circle having a diameter of 20 mm for example, so even though the preset irradiation position and the actual irradiation position do not exactly match in the radial direction, the preset irradiation position is included in the irradiation position that is fixed in the radial direction.

With this kind of construction, the irradiation position of the laser appears in a circle at an equal distance from the main axis 10c.

Therefore, the stopping position derivation unit 26b transmits only the rotation angle θ to the laser irradiation drive unit 24.

Here, an example is given of fixing the inclination angle φ of the laser irradiation unit 22, however, the inclination angle φ at which the laser is to be irradiated differs depending on the size and cutting height of the object 30 to be cut, and the protruding dimensions of the cutting tool 10b. Therefore, the user irradiates the laser onto a suitable preset cutting site by manually changing the inclination angle φ of the laser irradiation unit 22 according to the cutting conditions. The irradiation angle φ when doing that can be set by taking a plurality of samplings of the estimated distance r and using the average value and standard deviation of that distance r in Equation 3.

The laser irradiation drive unit 24, based on the stopping position, continuously moves the laser irradiation unit 22. Therefore, it becomes possible to constantly preheat the area around the preset cutting site, and thus it becomes possible to improve the cutting efficiency and convenience while at the same time avoid restricting areas that can be irradiated with the laser.

(Cutting Method)

Figure 4:
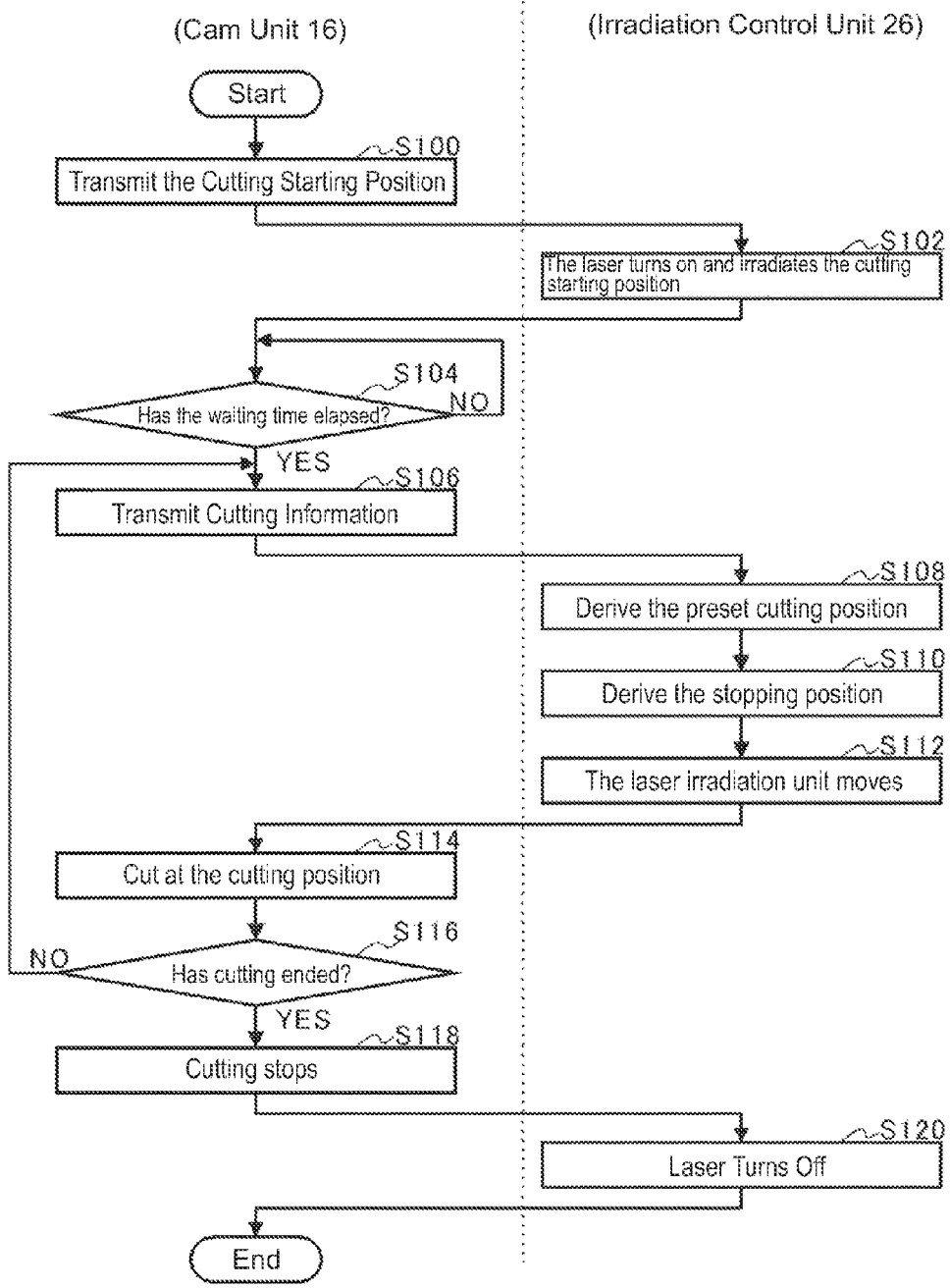
FIG. 4 is a flowchart illustrating the overall flow of the cutting method.

FIG. 4 is a flowchart that illustrates the overall flow of the cutting method. Here, the processing is explained by dividing the processing into that by the CAM unit 16 and that by the irradiation control unit 26. First, the CAM unit 16 references the NC program, acquires the cutting starting position and sends that to the irradiation control unit 26 (S100). The irradiation control unit 26 drives the laser irradiation drive unit 24, moves the laser irradiation unit 22 to the cutting starting position, turns the laser ON and starts laser irradiation (S102).

Next, the CAM unit 16 determines whether or not the waiting time for the laser to preheat the cutting starting position has elapsed (S104), and when the waiting time has not elapsed (S104: NO), the judgment of step S104 is repeated. When the waiting time has elapsed (S104: YES), the CAM unit 16 references the NC program, acquires all of the information, such as the current position of the cutting tool 10b (current cutting position), that is necessary for deriving the preset cutting position, and sends that information to the irradiation control unit 26 (S106).

The preset cutting position derivation unit 26a of the irradiation control unit 26 derives the preset cutting position (S108), and the stopping position derivation unit 26b derives the stopping position of the laser irradiation unit 22 on the guiderail 18 with the derived preset cutting position as the target (S110). Then, the laser irradiation drive unit 24, according to a control instruction from the irradiation control unit 26, moves the laser irradiation unit 22 to the derived stopping position (S112).

Next, the CAM unit 16 controls the cutting drive unit 10 so that cutting is performed at the cutting position indicated in the NC program (S114), and determines whether the NC program indicates that cutting is finished (S116). When the NC program does not indicate cutting is finished (S116: NO), processing is repeated from the information transmission step S106. When the NC program indicates that cutting is finished (S116: YES), the CAM unit 16 stops cutting by the cutting drive unit 10 (S118), and the irradiation control unit 26 turns OFF the laser (S120).

With the cutting device 1 and cutting method explained above, by rotating and moving the laser irradiation unit 22 around the main axis 10c, it is possible to avoid restricting the area that can be irradiated by the laser, and by preheating the preset cutting site, it is possible to improve the cutting efficiency and convenience.

Moreover, the laser irradiation unit 22 itself moves freely in a range of 360°, so it is possible to perform the cutting process with preheating without being accompanied by the rotation of the object 30 to be cut, which is advantageous when cutting a large member for which rotation of the object 30 to be cut is difficult.

Furthermore, the laser irradiation unit 22 is able to preheat the preset cutting position that is different than the cutting direction at the same time as cutting, so once cutting begins, it is possible to continuously cut the object 30 to be cut without stopping the cutting process, and thus it is possible to keep the cost and time required for cutting to a minimum.

The preheating mechanism of this embodiment can be used with an existing cutting device that is for performing milling, so there is no need for special equipment, and it is possible to suppress wear of the cutting tool 10b at low cost.

It is to be understood that the above-described embodiments are illustrative of only a possible specific embodiment which can represent an application of the principles of the invention. Numerous and varied other arrangements can be readily devised by those skilled in the art without departing from the spirit and scope of the invention.

The processes in the cutting method in this specification do not necessarily have to be performed in the time sequence of the order given in the flowcharts, and can be performed in parallel or can be included in a sub routine.

The present invention can be used for a cutting device and cutting method that cut an object into a free shape.

What is claimed is:

1. A cutting device having a cutting tool for cutting an object; comprising:

a mounting table to which the object to be cut is secured:

a cutting tool drive unit comprising a rotating member attached to the cutting tool for rotatably driving the cutting tool about a central axis thereof, and a non-rotating member concentrically mounted to the rotating member for supporting the cutting tool;

a relative movement mechanism for causing a relative movement of the cutting tool and the object to be cut;

a guiderail concentrically mounted to the non-rotating member of the cutting tool drive unit, wherein the guiderail is formed annularly to encircle an outer circumference of the non-rotating member;

a laser irradiation mechanism comprising a laser irradiation unit for irradiating a laser beam onto the object to be cut that is secured to the mounting table, and a support mechanism for rotatably supporting the laser irradiation unit along the guiderail, wherein the support mechanism comprises a rotating member concentrically mounted to the guiderail and adapted to rotate along an outer circumference of the guiderail, and a support member having one end attached to the rotating member of the support mechanism and the other end attached to the laser irradiation unit, and wherein the support member supports the laser irradiation unit such that an optical axis of the laser beam forms a predetermined inclination angle with respect to the central axis of the cutting tool;

a preset cutting position derivation unit for deriving a preset cutting position that corresponds to a portion of the object to be cut by the cutting tool after a predetermined amount of time has elapsed;

a stopping position derivation unit for deriving a stopping position of the laser irradiation mechanism along the guiderail, wherein the stopping position corresponds to a position which enables the laser irradiation unit to direct a laser beam onto the preset cutting position on the object to be cut; and a laser irradiation drive unit connected to the support mechanism and the stopping position derivation unit, and for moving the laser irradiation mechanism to the stopping position derived by the stopping position derivation unit.

2. The cutting device according to claim 1, wherein the preset cutting position derivation unit derives the preset cutting position by adding a distance to the current cutting position of the cutting tool on the object to be cut wherein the distance is equal to the amount that the cutting tool moves over the object to be cut during the predetermined time.

3. A cutting method for cutting an object by a cutting device, wherein the cutting device comprises:

a mounting table to which the object to be cut is secured:

a cutting tool drive unit comprising a rotating member attached to the cutting tool for rotatably driving the cutting tool about a central axis thereof, and a non-rotating member concentrically mounted to the rotating member for supporting the cutting tool;

a relative movement mechanism for causing a relative movement of the cutting tool and the object to be cut;

a guiderail concentrically mounted to the non-rotating member of the cutting tool drive unit, wherein the guiderail is formed annularly along to encircle an outer circumference of the non-rotating member; and a laser irradiation mechanism comprising a laser irradiation unit for irradiating a laser beam onto the object to be cut that is secured to the mounting table, and a support mechanism for rotatably supporting the laser irradiation unit along the guiderail, wherein the support mechanism comprises a rotating member concentrically mounted to the guiderail and adapted to rotate along an outer circumference of the guiderail, and a support member having one end attached to the rotating member of the support mechanism and the other end attached to the laser irradiation unit, and wherein the support member supports the laser irradiation unit such that an optical axis of the laser beam forms a predetermined inclination angle with respect to the central axis of the cutting tool;

the cutting method comprising the steps of:

deriving by a preset cutting position derivation unit, a preset cutting position that corresponds to a portion of the object to be cut by the cutting tool after a predetermined amount of time has elapsed;

deriving by a stopping position derivation unit, a stopping position of the laser irradiation mechanism along the guiderail, wherein the stopping position corresponds to a position which enables the laser irradiation unit to direct a laser beam onto the preset cutting position derived by the preset cutting position derivation unit; and moving the laser irradiation mechanism by a laser irradiation drive unit, to the stopping position derived by the stopping position derivation unit wherein the laser irradiation drive unit is connected to the support mechanism and the stopping position derivation unit.

* * * * *